(12) United States Patent
Marie

(10) Patent No.: US 6,351,232 B1
(45) Date of Patent: Feb. 26, 2002

(54) ELECTRICAL APPLIANCE WITH PARAMETERABLE FUNCTION AT REDUCED COST

(75) Inventor: Jean-Louis Marie, Soliers (FR)

(73) Assignee: Crouzet Automatismes, Valence (FR)

( * ) Notice: Subject to any disclaimer, the term of this patent is extended or adjusted under 35 U.S.C. 154(b) by 0 days.

(21) Appl. No.: 09/555,374

(22) PCT Filed: Oct. 30, 1998

(86) PCT No.: PCT/FR98/02331

§ 371 Date: May 30, 2000

§ 102(e) Date: May 30, 2000

(87) PCT Pub. No.: WO99/28796

PCT Pub. Date: Jun. 10, 1999

(30) Foreign Application Priority Data

Nov. 28, 1997 (FR) ............................................. 97 15011

(51) Int. Cl.$^7$ ................................................. H03M 1/12
(52) U.S. Cl. ......................................... 341/155; 341/16
(58) Field of Search ........................... 341/16, 17, 155; 219/506

(56) References Cited

U.S. PATENT DOCUMENTS 4,420,669 A * 12/1983 Scalf et al. ............... 219/10.55
4,551,618 A * 11/1985 Payne ......................... 219/510
5,874,938 A * 2/1999 Marten .......................... 345/156

\* cited by examiner

Primary Examiner—Tuan T. Lam
(74) Attorney, Agent, or Firm—Oblon, Spivak, McClelland, Maier & Neustadt, P.C.

(57) ABSTRACT

An electrical apparatus having at least one parametrizable function and which includes at least one potentiometer having an actuation member, cooperating with notched indexation devices demarcating several discrete positions of the actuation member. Each discrete position corresponds to a desired value of a parameter. An analogue/digital conversion and interpretation circuit receives an analogue voltage delivered by the potentiometer, dependent on the discrete position taken by the actuation member, and delivers a digital signal representative of the position of the actuation member and hence of the desired value of the parameter.

20 Claims, 8 Drawing Sheets

ELECTRICAL APPLIANCE WITH PARAMETERABLE FUNCTION AT REDUCED COST

BACKGROUND OF THE INVENTION

The present invention relates to a reduced cost electrical apparatus having parametrizable function.

DISCUSSION OF THE BACKGROUND

A large number of electrical apparatuses possess a parametrizable function, this signifying that the user of the apparatus can allocate to a parameter a value chosen from among several possible values and that the apparatus takes this value into account in its operation. The apparatus then generally has one or more actuation members which the user can move in such a way as to make it take a discrete position chosen from several positions. The actuation member can be a control button with rotary or linear movement, which can be actuated manually, either directly or, for buttons of very small size, by way of a small screwdriver; the control button is accessible to the user from outside the shroud of the apparatus and the various discrete positions which it can take are labelled on the shroud of the apparatus.

For example, in a timer, the parametrizable functions may be the duration of the timing or an operational mode. The range of values for the timing can, for example, lie between 0.06 seconds and 30 hours. The operational mode relates to the operation of the relay or relays which the timer contains. Several operational modes exist and amongst the most widely used are delayed switch-on or the complementary thereof. In the first mode, the timing begins when the timer is switched on and the relay changes state at the end of timing and in the second mode, the relay changes state at switch-on and retains this state throughout the duration of the timing before reverting to its original state at the end of timing.

The allocating of a value to a parameter is achieved either by virtue of a switch with several positions, so as to define for example an operational mode or a range of values of a parameter (range of durations for a timer), or by way of a potentiometer with fine adjustment so as to define an accurate value of a parameter (adjustment of duration within the chosen range).

Figure 1:
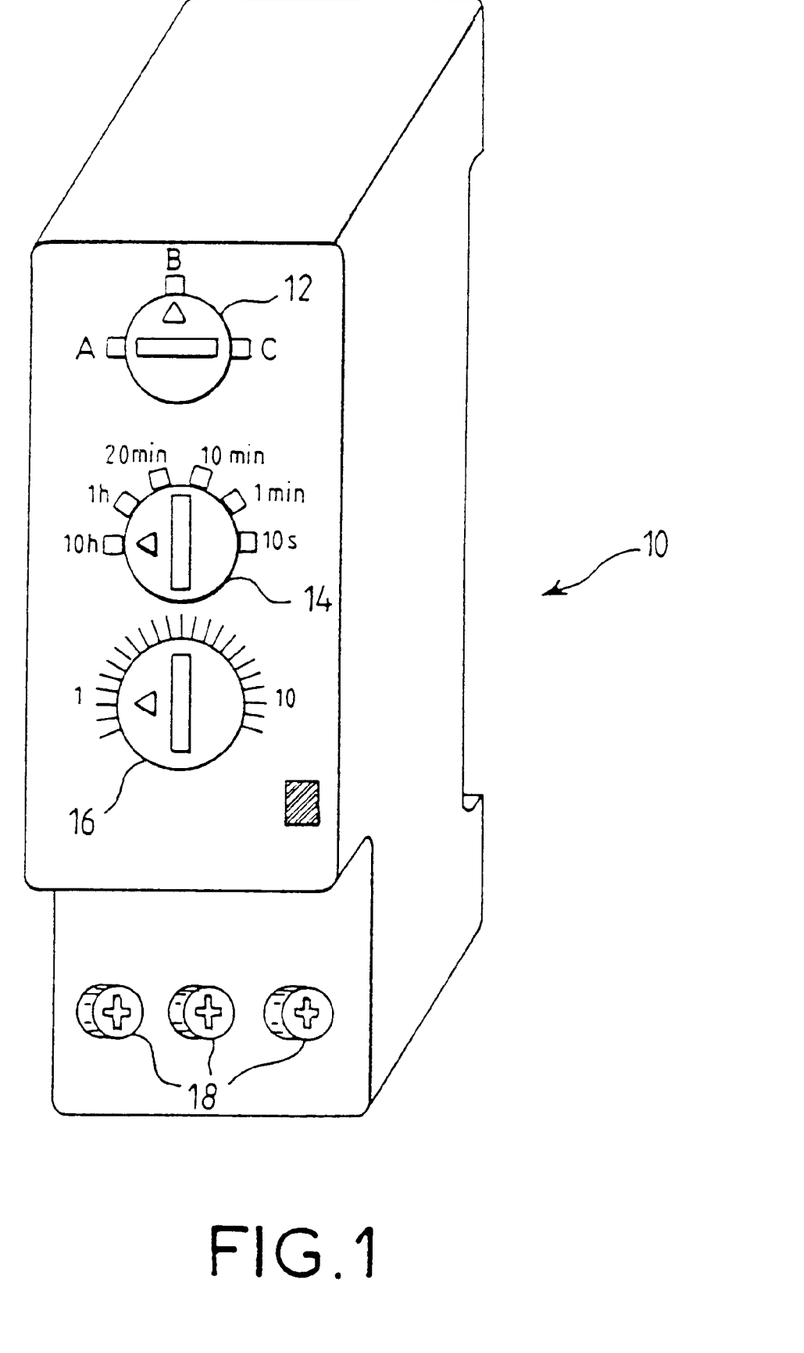
FIG. 1, a timer in which the invention may be incorporated.

For example, one can imagine a timer with three operational modes, six ranges of durations, and fine adjustment within each range of duration. Such a timer is represented in FIG. 1 (referenced 10). If it were constructed according to the principles of the known technique, its front face would carry three control buttons:

the upper button 12 would actuate a switch with three positions making it possible to chose one of three possible modes of operation labelled by the letters A, B and C;

the central button 14 would actuate a switch with six positions making it possible to define six possible ranges of duration, labelled on the box by indications representing (for example) the maximum value of duration possible for each range;

the lower button 16 would actuate a fine-adjustment potentiometer, graduated from 1 to 10 (for example), allowing continuous adjustment of the duration within the range selected by the button 14.

The orifices 18 at the base of the front face of the timer allow access to screws for binding electrical wires via which the timer can be connected to an electrical installation in which it achieves its function.

The switches which select the ranges of parameters or the operational modes may be expensive, especially if they must possess a considerable number of positions. They are in general devised so as to provide directly in binary form a digital signal controlling the electronic circuits which serve to establish the operation of the timer. A switch having a number of positions N which is strictly less than $2^p$ provides a digital signal of p bits. The larger N is, the larger p must be and the more expensive is the switch.

This is all the more true if the switches have to be miniaturized. Typically, the width of the timer represented in FIG. 1 could be less than 2 centimetres, and the control buttons 12, 14, and 16, as well as the switches and potentiometer which are behind the buttons, do not exceed one centimetre in diameter.

On the other hand, the larger the number N of positions of the switch, the more expensive the electronic circuit (microcontroller type) which ensures the operation of the apparatus is liable to be, owing to the fact that this circuit must possess p inputs reserved for the link with the switch.

SUMMARY OF THE INVENTION

The invention aims to diminish these drawbacks while contriving matters such that the user has a practically unchanged perception of the operation of the apparatus.

To accomplish this, the present invention proposes an electrical apparatus having at least one parametrizable function, characterized in that it comprises at least one potentiometer having an actuation member, cooperating with notched indexation means, these indexation means demarcating several discrete positions of the actuation member, each position corresponding to a desired value of a parameter, means of analogue/digital conversion and interpretation receiving an analogue voltage delivered by the potentiometer, dependent on the discrete position taken by the actuation member and delivering a digital signal representative of the position of the actuation member and hence of the desired value of the parameter, this digital signal serving as parametrization control signal for the apparatus.

Thus, according to the invention, the switch for selecting parameter, range of parameters, or operational mode, is physically replaced by an indexation potentiometer. This potentiometer, supplied with a voltage, delivers an analogue signal, and it is within the electronics of the apparatus that this signal is converted into a digital value (that which in the prior art was delivered by a switch) representing the index on which the actuation member of the potentiometer is positioned. Hence, the variation in the resistance of the potentiometer is harnessed in order to determine the indexed position on which the actuation member has been placed. It will be noted that the analogue/digital conversion can form part of the microcontroller which manages the entire operation of the apparatus, so that a single microcontroller input is then required to achieve the link with the potentiometer regardless of the number N of indexed positions which may be taken by the actuation member of the potentiometer.

The potentiometer, even when provided with notched indexation means, is less expensive than a switch once the number of indexed positions exceeds 3 or 4.

The user does not perceive any difference relative to the apparatuses which he customarily knows: the control buttons remain identical and the marking of the positions can remain unchanged; the sensation of turning a switch remains present by virtue of the notches of the indexation means.

If the potentiometer is sufficiently accurate and linear, and if it is supplied with a sufficiently accurate voltage, the means of analogue/digital conversion and interpretation may comprise a straightforward analogue/digital converter which receives the analogue voltage and which delivers directly the digital signal representative of the position of the actuation member.

If the potentiometer is nearer the bottom of the range, and in particular if it is not linear or not sufficiently linear (whereas one wishes to distribute the indexed positions very regularly), the means of analogue/digital conversion and interpretation may comprise not only an analogue/digital converter which receives the analogue voltage and which delivers an intermediate digital signal which directly represents the position of a slider of the potentiometer, but also a decoding device which receives this intermediate digital signal and which transposes it into a digital signal representative of one actuation member position from among N indexed positions. In this case, it will be understood that the intermediate digital signal can comprise m bits, with m greater than the number p of bits defining one from among N positions.

To simplify the construction, one may envisage the notched indexation means as forming part of the potentiometer.

To diminish the consequences of the uncertainty in the exact position of the slider with respect to the resistive track, it is possible for the resistive track to take the form of discontinuous resistive lands separated by conductive lands.

If the apparatus comprises several potentiometers, it is preferable to provide a multiplexer inserted between the potentiometers and the means of analogue/digital conversion and interpretation, thereby making it possible to avoid increasing the number of analogue/digital converters.

From the mechanical point of view, the indexation means can comprise a first indexation means integral with the actuation member and a second indexation means carried by a shroud of the apparatus.

In order for the switching from one discrete position to another to occur in a crisp and reliable manner, it is preferable for the cooperation between the indexation means to be of elastic type, that is to say that a certain restoring force compels the actuation member to stabilize on one of the indexed positions, without resting between two positions.

One of the two indexation means can comprise at least one lug and the second indexation means several notches, the lug becoming housed in one of the notches. Or conversely, there are several lugs and one notch, the notch becoming applied to one of the lugs.

BRIEF DESCRIPTION OF THE DRAWINGS

Other characteristics and advantages of the invention will become apparent on reading the following description illustrated by the appended figures which represent.

These figures merely represent exemplary embodiments of the apparatus according to the invention; other variants are conceivable without departing from the scope of the invention. These figures are not to the same scale for the sake of clarity.

DESCRIPTION OF THE PREFERRED EMBODIMENTS

For simplicity, the invention will be described with regard to a timer such as that which has been described with regard to FIG. 1, it being understood that apparatuses fulfilling other parametrizable functions may use the invention profitably.

The exterior appearance and the functionalities of the timer can be exactly those which have already been described with regard to FIG. 1, that is to say, in this example, three possible operational modes, six ranges of duration, and continuous adjustment of duration within a selected range. However instead of the control buttons 12 and 14 being actuation members of switches, they become control members of notched potentiometers. The control button 16 is still the actuation member of a continuous-adjustment potentiometer.

Before explaining the principal of electrical operation of control by notched potentiometers, a possible exemplary mechanical construction of these potentiometers will be given, such as they are incorporated into the apparatus. It will be understood that the indexation of the potentiometer can be carried out on the potentiometer itself or on its actuation member, and it is this last solution which will be described more precisely. It makes it possible to use on the one hand a fairly inexpensive potentiometer and on the other hand an indexed actuation member which could either be used for a switch (conventional solution) or for a potentiometer (solution according to the invention).

Figure 2:
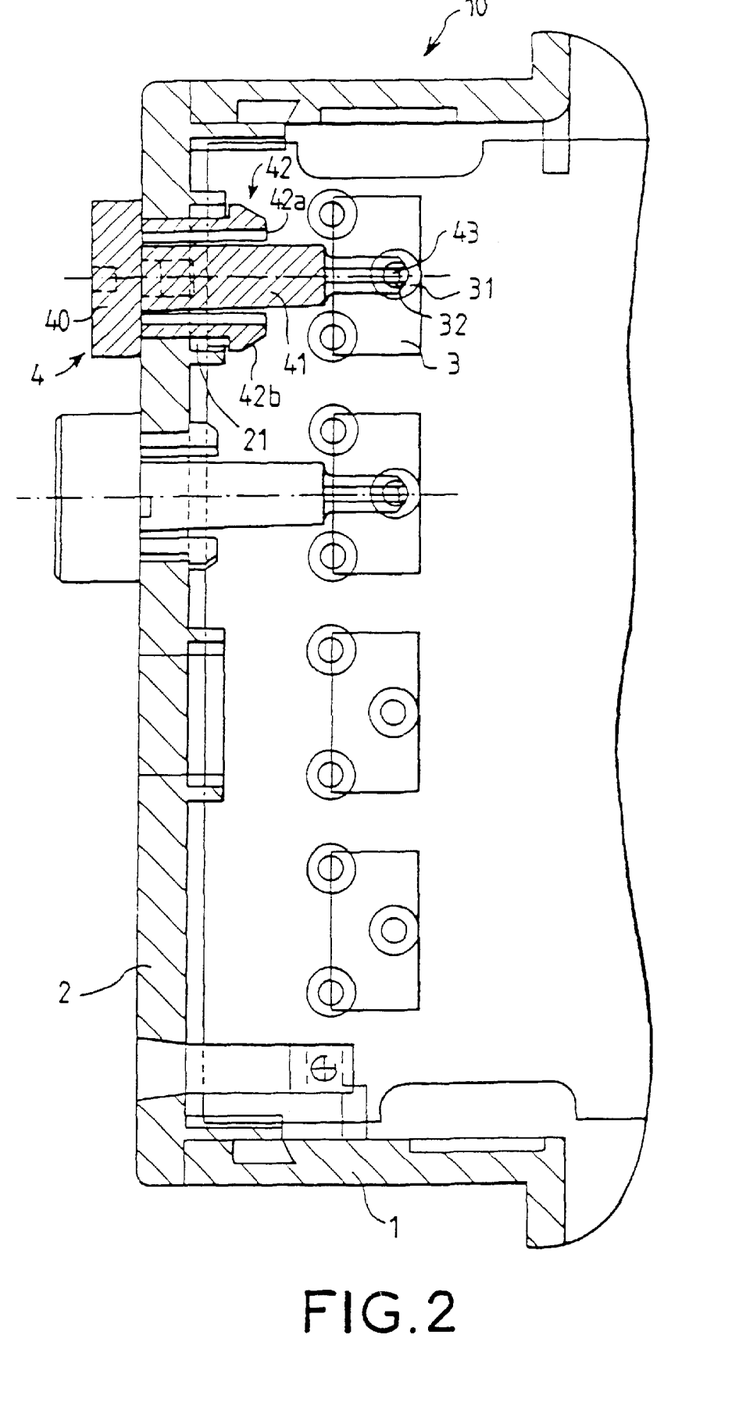
FIG. 2, a lateral section through the shroud of the apparatus, showing the incorporation of an indexation potentiometer in the front face of this shroud.

FIG. 2 represents a lateral section through the apparatus, together with at least one potentiometer and its indexation control member.

The apparatus 10 comprises a shroud 1 with a front wall 2, a potentiometer 3 placed inside the shroud, and an actuation member 4 of the potentiometer 3, accessible from outside the shroud 1 so that an operator can manipulate it. The actuation member 4 is situated on the front face 2 but other positions could be envisaged. It can project with respect to the front face, then accessible directly by hand, or be slightly set back behind the front face, then accessible via a screwdriver.

The actuation member 4 comprises a first part 40 in the shape of a cylindrical button which can be actuated from outside the shroud 1 and this first part 40 is extended via a second part 41 in the shape of a rod which projects inside the shroud 1 towards the potentiometer 3.

The rod 41 terminates in an end 43 which is intended for actuating the slider 31 of the potentiometer 3. The end 43 of the rod 41 can be cross-shaped, flat or canted and is able to penetrate into an orifice 32 of appropriate geometry of the slider 31 of the potentiometer, in such a way that the rotation of the button 40 causes the rotation of the slider. The potentiometer is not represented in detail since it may be any type of potentiometer, including a very low quality and hence very low cost potentiometer. Typically, use will be made of a straightforward potentiometer with continuous annular resistive track, on which will rub a rotationally moveable slider.

The shroud 1 of the apparatus possesses an opening 21, visible in FIG. 2, for allowing through the rod 41. Indexation means may be accommodated in this opening as will be seen.

The actuation member 4 which passes through the opening 21 is preferably equipped with means 42 for snap-fastening into the shroud 1. These snap-fastening means 42 comprise, for example, one or more elastic tabs 42a each terminating in a projecting element 42, for example in the shape of a flange, so as to achieve translational immobilization of the actuation member 4 when it has been inserted into the opening 21.

In the example described, the snap-fastening means 42a, 42b are integral with the button 40 but it would have been possible to envisage them being integral with the rod 41.

Figure 3A:
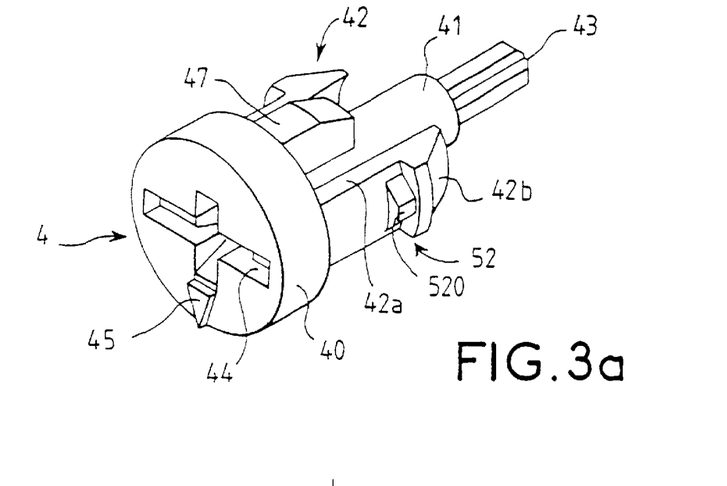
FIGS. 3a, 3b, 3c, respectively in perspective view, in rear view (from inside the shroud), and in longitudinal section, the actuation member.
Figure 3B:
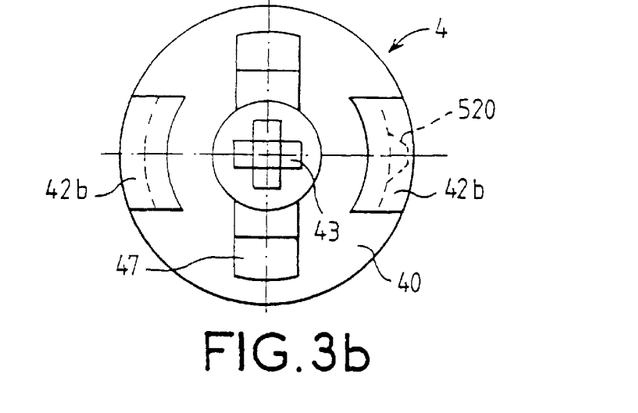
Figure 3C:
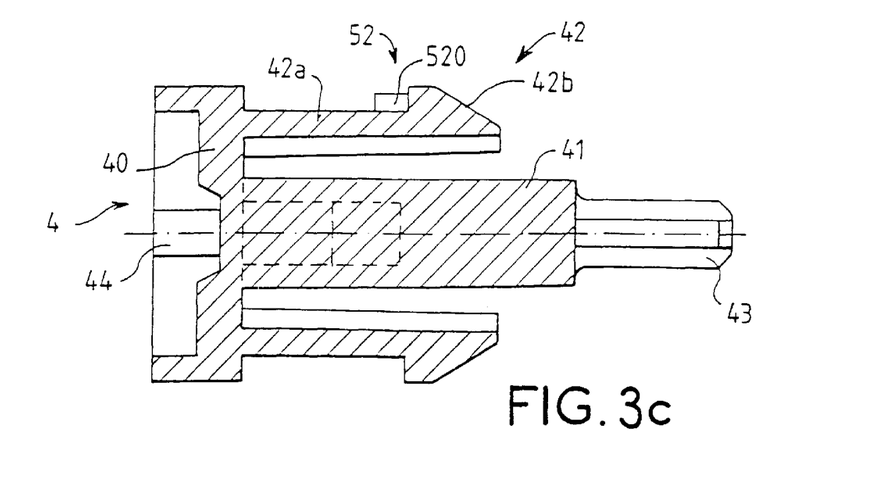

Represented in greater detail in FIGS. 3a, 3b and 3c are respectively in perspective, in rear view, and in longitudinal section, the construction of the actuation member 4 together with the elements already described: cylindrical button 40, rod 41, snap-fastening means 42, slider actuation end 43. Also seen therein are fixed tabs 47 of the same diameter as the inside diameter of the opening 21, so as to ensure the retention, guidance and rotation of the button in the opening 21.

The button 40 can furthermore comprise slots 44 so as to be accurately moveable with the aid of a screwdriver. In certain electrical apparatuses, the button 40 will be relatively small, for example less than a centimetre in diameter and its actuation by grasping it with the fingers is not easy.

The button 40 can also carry a label 45, whilst the shroud 1 carries as many marks as discrete positions of the actuation member 4 and hence as desired values of the parameter selected by the button (here: operational modes or ranges of duration). The label 45 located opposite a mark of the shroud makes it possible easily to display the selected value of the parameter.

The discrete positions which can be taken by the actuation member 4 make it possible to obtain a succession of discrete values of resistance of the potentiometer. These positions are obtained via notched indexation means with which the actuation member 4 cooperate [sic]. These notched indexation means 52, 53 are made up of a first indexation means 52 carried by the actuation member 4 (FIGS. 3a, 3b and 3c) and of a second indexation means 53 (FIGS. 4 and 5) which is fixed with respect to the apparatus 10.

The first indexation means 52, integral with the actuation member 4, is represented in FIGS. 3a, 3b and 3c in the form of at least one lug 520 of trapezoidal shape. This lug is preferably carried by one of the elastic snap-fastening tabs 42, but it is also possible to place it elsewhere.

Figure 4:
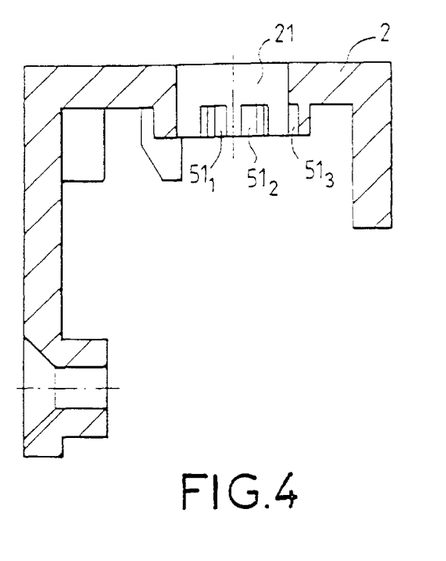
FIG. 4, a horizontal section showing the opening in the front wall of the apparatus, in which opening may be formed means of indexing the control of the potentiometer.
Figure 5:
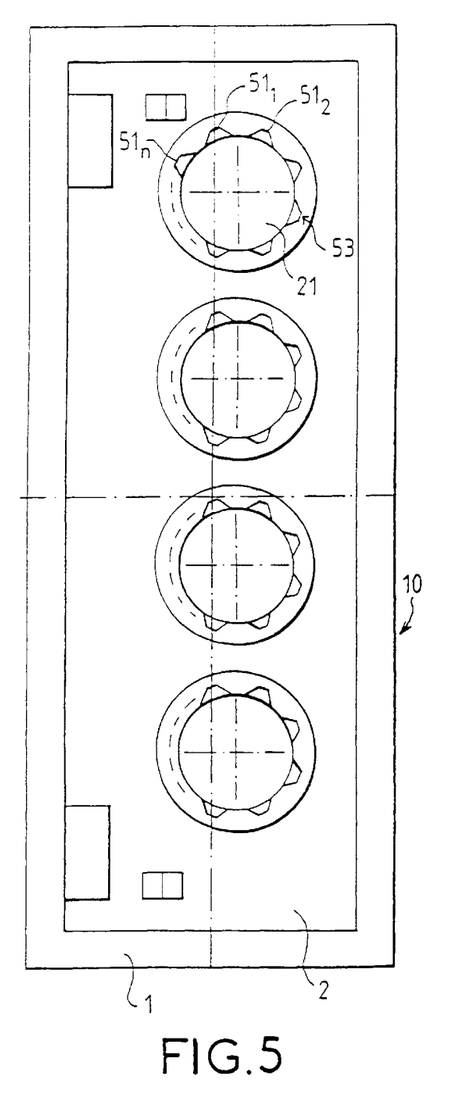
FIG. 5, a rear view of the front wall of the shroud of the apparatus, also showing these indexation means.

In the example represented, the second indexation means 53, fixed with respect to the apparatus 10, is situated on the shroud 1 and more precisely on the rear face of the front wall 2 of the apparatus 10. It is formed by a succession of notches or indents $51_1$ to $51_n$, which have substantially the same trapezoidal shape as the lug 520. The lug 520 is intended to become housed in one of the notches 51 to $51_n$ when the actuation member 4 takes one of the desired discrete positions, and to pass from notches to notches when the actuation member 4 is actuated. The notches are situated at the edge of the opening 21 of the shroud 1 as may be seen in FIGS. 4 (plan view) and 5 (rear view, that is to say viewed from the interior of the apparatus, of the front wall 2).

In the example described, the notches $51_1$ to $51_n$ are made on the interior face of the shroud 1 and are not visible from outside the shroud 1. They can be moulded in the shroud 1 if the material of the shroud 1 lends itself thereto. Of course, one can envisage the notches being hollowed out on the exterior face of the shroud 1. The choice depends on the position of the first indexation means 52.

The number of notches is at least equal to the number of discrete positions $51_1$, to $51_n$ desired for the actuation member 4, and hence to the number of values desired for the parameter for adjusting the apparatus.

In order for the lug to pass from one notch to the next in a crisp and reliable manner, there is provision for the first indexation means 52 and/or the second indexation means 53 to be elastic. By placing the lug 520 on the elastic tabs 42a of the snap-fastening means 42 this condition is fulfilled.

The elasticity of the snap-fastening tabs, which is provided so as to allow the force-fitting insertion and then the retention of the actuation member in the opening 21, in fact serves also to return the lug 520 towards the interior of the notches, that is to say towards the periphery of the opening 21. The depth of the notches is smaller than the elastic deflection of the snap-fastening tabs, so that the lug can leave the notches when the control button is turned. The trapezoidal shape of the notches and of the lug makes it easier for the lug to leave a notch and for it to penetrate into another notch. Preferably, the bearing surface available between two notches is sufficiently small to prevent the lug from stabilizing outside a notch.

Figure 6:
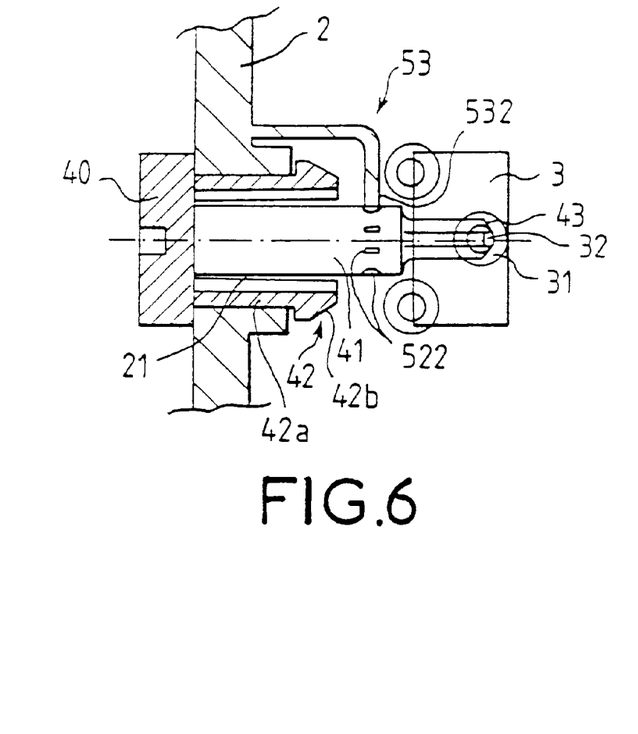
FIG. 6, a variant embodiment of the indexation means.

Instead of the first indexation means 52 being formed by a lug and instead of the second indexation means 53 being formed by several notches, it is possible to envisage the contrary as illustrated in FIG. 6.

The second indexation means 53 now comprises a lug 532, integral with the shroud 1 and which projects inside the shroud towards the actuation member. The first indexation means 52 comprises a succession of notches 522 carried by the rod 41 of the actuation member 4. The lug 532 exhibits sufficient elasticity to allow its elastic retention in a notch, and to allow it to leave this notch.

Instead of providing at least one lug and a succession of notches, the lug passing from notch to notch, it would be possible to provide at least one notch and a succession of lugs, one of the lugs becoming housed in the notch according to the discrete position of the actuation member 4. These lugs belong either to the first indexation means, or to the second indexation means and the notch respectively either to the second indexation means, or to the first indexation means. It is then the notch which is formed on an elastic member which returns it towards a lug.

Figure 7:
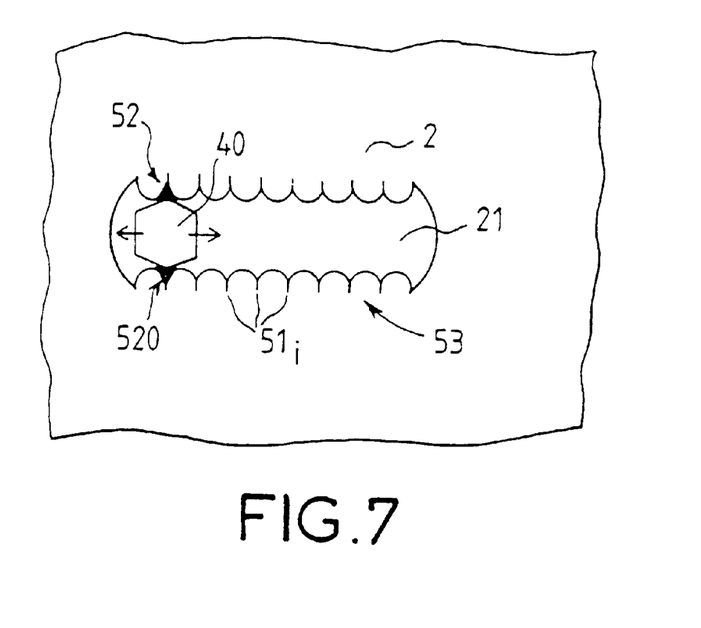
FIG. 7, an indexed actuation member of linear type.

In the example of the previous figures, the actuation member 4 is rotationally mobile but its movement could also be a translation as illustrated by FIG. 7.

Figure 8:
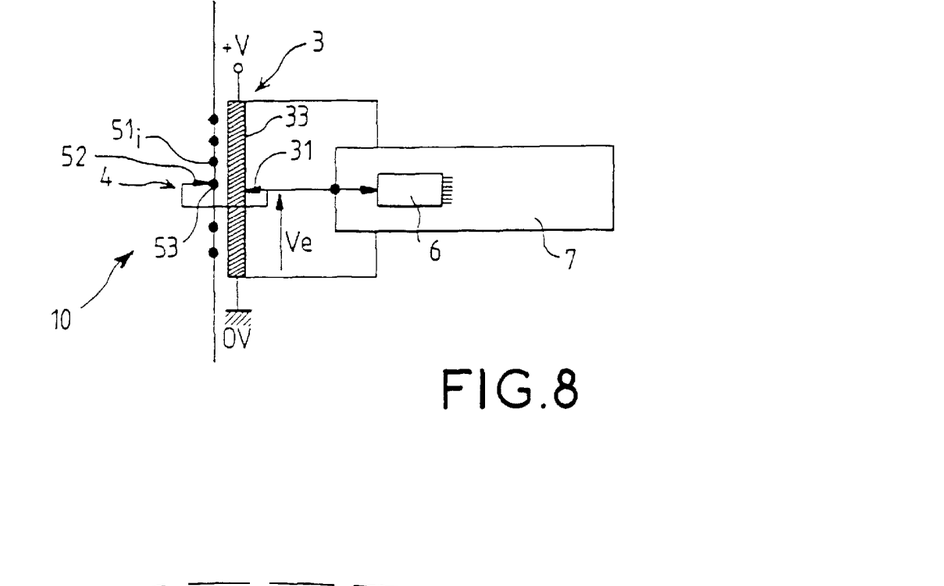
FIG. 8, an electrical diagram explaining the electrical operation of the apparatus.

FIG. 8 represents the principle of electrical operation of the apparatus.

The potentiometer 3 is shown diagrammatically by a resistor 33. Its slider 31 is moved and takes the various discrete positions 51, under the control of its actuation member 4. The potentiometer is for example quite simply supplied with a voltage V so that a fraction of this voltage, which can vary discretely, appears on its slider. The potentiometer could also be mounted in a resistor bridge.

The analogue voltage Ve present on the slider is applied to the input of the electronic circuits which allow the apparatus to execute the parametrizable functions for which it is provided. These circuits essentially comprise a processing device 7 which consists in practice of a programmed microcontroller. For the embodiment of the invention, the electronic circuits must comprise means of analogue/digital conversion and interpretation 6, which are preferably integrated into the microcontroller. These means of analogue/digital conversion and interpretation 6 establish a digital signal of p bits, representing one of the N possible discrete positions of the indexation potentiometer, and therefore representing one of the desired values of the parameter adjusted by this potentiometer. This digital signal of p bits replaces the signal of p bits which would have been provided in the prior art by a switch with p bits. It is used directly by the processing device 7 in order to operate the apparatus with the value of selected parameter.

In the simplest case, the means of analogue/digital conversion and interpretation-comprise a straightforward analogue/digital converter of p bits. However, this presupposes that the potentiometer is very accurate, and very linear, so that there is a one-to-one correspondence, for each discrete position of the slider, between the geometrical position of the slider and the signal of p bits which results therefrom. If one wishes to use a low-cost potentiometer, of may be [sic] considerable scatter, supplied with a voltage which is not necessarily very accurate, possibly subjected to considerable climatic, thermal and mechanical constraints, the one-to-one correspondence will be difficult to obtain via a straightforward analogue/digital converter of p bits.

One therefore prefers to use an analogue/digital converter of higher resolution, for example of p+m bits and decoding means, the converter and the decoding means together constituting the means of conversion and interpretation 6 mentioned hereinabove. The decoding means then match the various possible values of the analogue voltage, which are digitally coded on p+m bits, with a single digital value coded on p bits which represents a discrete position to which this analogue voltage value is assumed to correspond. There is moreover no need for the single value coded on p bits to correspond precisely to the p highest order bits of the digital value coded on p+m bits, the decoding table being arbitrary. In particular, this correspondence will not in general exist if the potentiometer is not sufficiently linear.

The decoding means can be integrated, just like the analogue/digital converter, into a microcontroller constituting the nub of the circuits 7. These decoding means can consist of an electrically programmable read-only memory. Any defects in the potentiometers, or the adapting of the apparatus to another potentiometer, or changes in supply voltage, can be taken into account by having a read-only memory with several different areas, or even by changing the content of the read-only memory.

A single link is required between a specified indexation potentiometer and the microcontroller.

Figure 9:
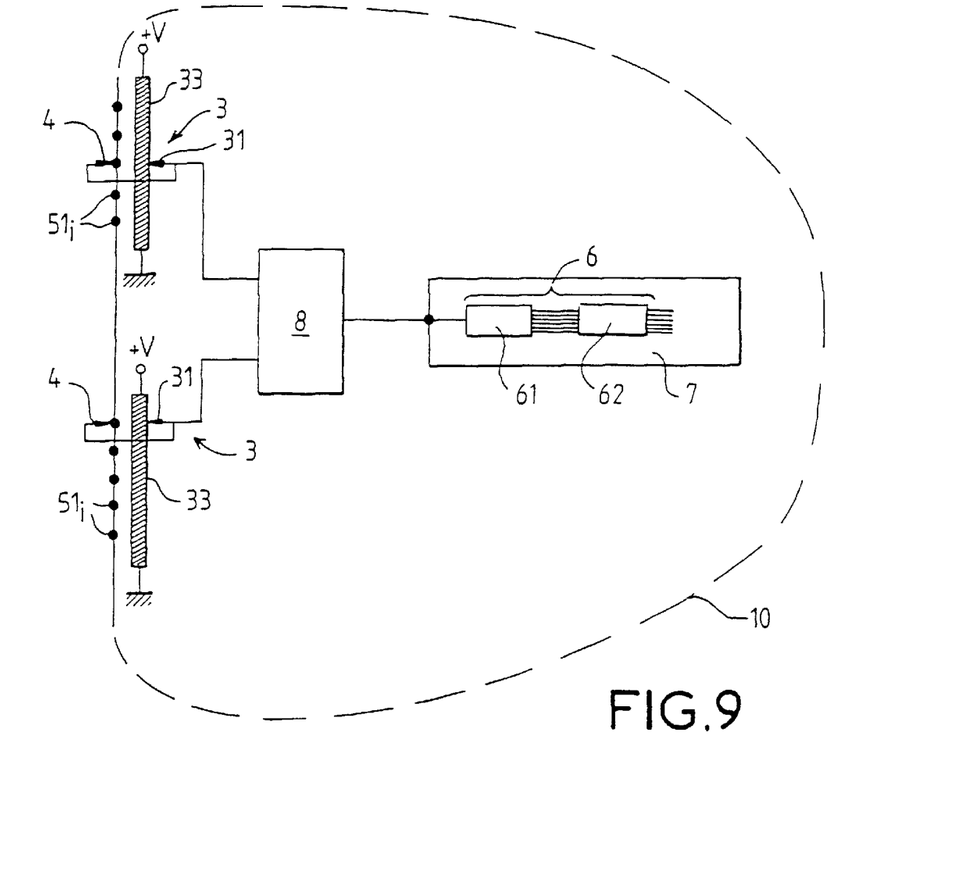
FIG. 9, a variant electrical diagram using a multiplexer for several indexed potentiometers.

If the apparatus possesses several potentiometers 3, it is possible to use the same analogue/digital converter for all the potentiometers, on condition that a multiplexer is interposed between the potentiometers and this converter. The multiplexer 8 can form part of the microcontroller, in which case the microcontroller must posses as many inputs as potentiometers. It can also be outside the microcontroller and placed upstream of the latter, in which case a single analogue link is required between the output of the multiplexer and the microcontroller, the various potentiometers being linked to the various inputs of the multiplexer 8 as is represented in FIG. 9. The analogue/digital converter is designated by reference 61 in FIG. 9, and it is followed by a decoding means 62.

If moreover there is in the apparatus a potentiometer with continuous, non-indexed, adjustment, as is the case for the timer represented in FIG. 1 which possesses continuous adjustment of timing duration within a range of selected durations, this continuous-adjustment potentiometer can be connected across the multiplexer to the same microcontroller (and in practice to the same analogue/digital converter). The resulting signal is utilized by the apparatus to define the end of duration adjustment.

Figure 10:
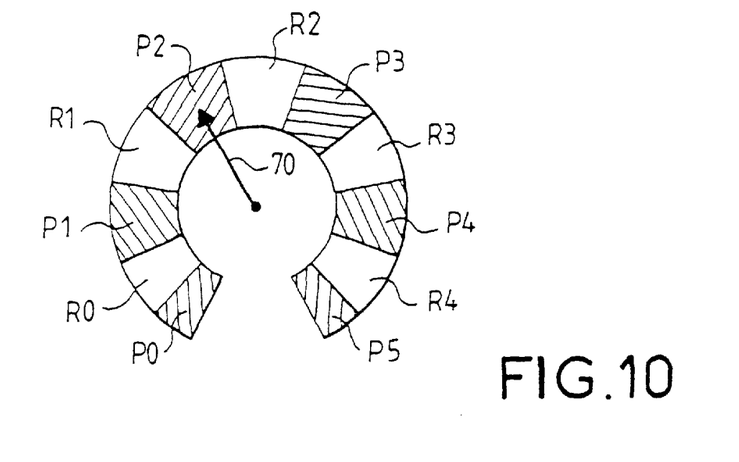
FIG. 10, diagrammatically a potentiometer with resistive track formed by discontinuous resistive lands.

FIG. 10 diagrammatically represents a particular embodiment of the invention, in which the resistive track of the potentiometer, on which the slider of the potentiometer (represented by symbolic arrow 70) moves, takes the form of discontinuous resistive lands R0 to R4, separated by conductive lands P0 to P5 (hatched).

Each conductive land is situated at the site of a respective discrete position of the slider as defined by the notched indexation means (which are not represented in FIG. 10).

This particular arrangement is aimed at diminishing the consequences of the uncertainty in the exact position of the slider with respect to the resistive track when the slider is on an indexed position, given the manufacturing scatter from one apparatus to another.

In practice, the resistive track is a track which is continuous over the entire extent of movement of the slider, but it is covered locally, at the site of the lands P0 to P5, by a conductive layer which locally short-circuits the resistive track and which therefore endows it with a discontinuous configuration. Silver paste can be used for the conductive layer.

Figure 11:
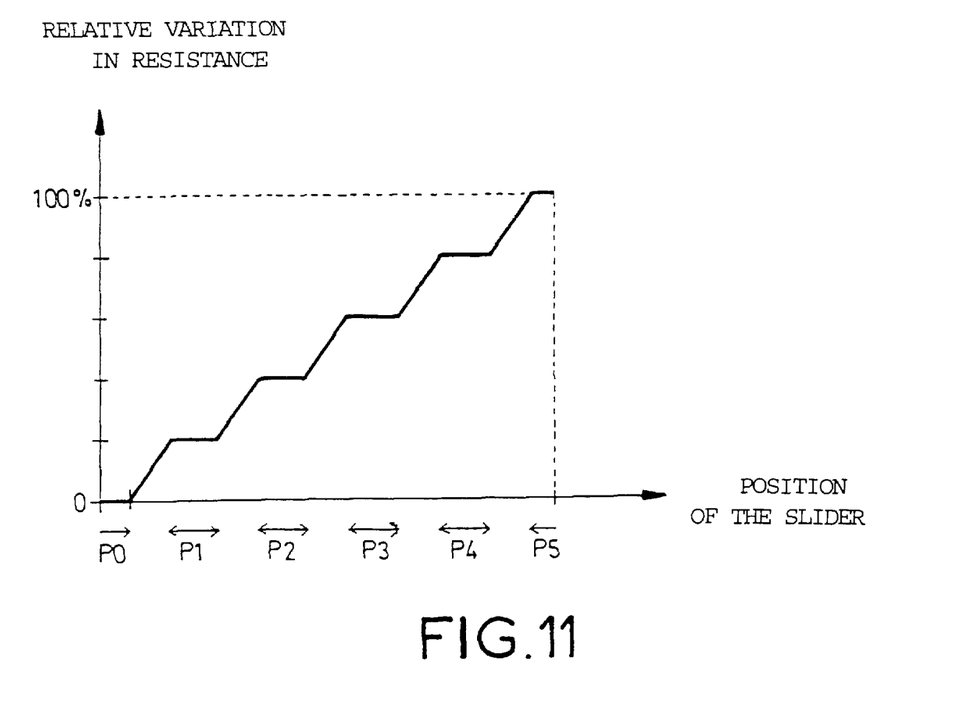
FIG. 11, a curve illustrating the relative variation in resistance as a function of the position of the slider of the potentiometer of FIG. 10.

The graph of the relative variation in the resistance of the potentiometer versus the variation in the position of the slider is then that of FIG. 11: the resistance varies stepwise.

The use of conductive lands which overall have a length (along the track) substantially equal to the total length of the resistive lands, or even twice this length, seems to be a satisfactory compromise.

It will be noted that if the value of the total resistance of the potentiometer (slider at end of track) is imposed, it is necessary to increase the resistance of the track per unit length with respect to what it would be in the absence of conductive lands. For example, a potentiometer envisaged for 200 kilohms in total will have to be constructed from a resistive layer correspond [sic] theoretically to a potentiometer of around 500 kilohms.

Figure 12:
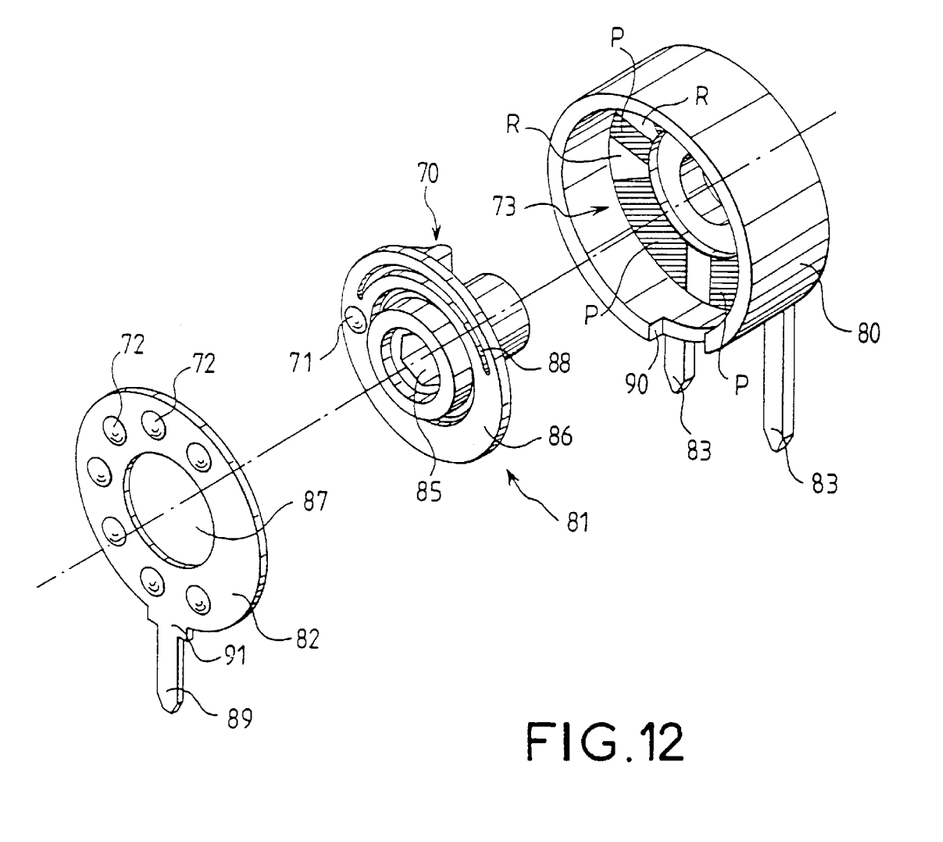
FIG. 12, an exploded view of a potentiometer including the notched indexation means.

FIG. 12 represents an exploded view of a practical exemplary embodiment in which the notched indexation means 71, 72 form part of the potentiometer 3 itself and in which the resistive track R is rendered discontinuous by the use of conductive lands P which locally cover the resistive track at the site of the indexed positions of the slider 70.

The potentiometer represented comprises three parts 80, 81, 82. Part 80, on the right in the figure, is a box which contains in the bottom thereof the resistive track 73 formed by discontinuous resistive lands R separated by conductive lands P. With a view to the electrical supply of the potentiometer the two ends of the resistive track 73 are each linked to a conductive tab 83 which leaves the box. In the example of FIG. 12, the ends of the track 73 are situated at the level of conductive lands P.

The rotationally moveable middle part 81 becomes housed in the box.

It comprises a conductive ring 86 provided with a relief part 70 which forms the slider and which comes into contact with the resistive track 73 when the middle part 81 is mounted in the box 80. The relief part 70 is V shaped in the example described.

This conductive ring 86 is mounted around an insulating spindle 85 which serves in the rotational actuation of the slider 70. During mounting, the insulating spindle 85 comes to bear on one side at the bottom of the box. On the other, the spindle 85 can be accessed from outside the box so as to allow the actuation of the ring and hence of the slider 70. In FIG. 12 the spindle 85 is hollow and can be rotated with the aid of a screwdriver so as to move the slider 70.

The last part 82 is a cover which is secured to the box 80 in order to close it.

The cover 82 comprises an opening 87 for allowing through the insulating spindle 85. The notched indexation means 71, 72 consist simply of bosses cooperating with one another. The first indexation means 71 is formed by at least one boss, carried by the ring 86, in relief towards the cover 82 in the example described.

The second indexation means 72 is formed by several bosses, carried by the cover 82, sunken towards the ring 86. A boss 71 carried by the ring 86 in relief towards the cover 82 becomes housed in one of the bosses 72 carried by the cover. When the ring 86 is rotated the boss 71 passes from boss 72 to boss 72 and the slider 70 from conductive lands to conductive lands.

In the example, the number of bosses 72 corresponds to the number of discrete positions desired by the actuation member. It is of course possible to employ a boss 71 sunken towards the cover 82 and bosses 72 in relief towards the ring 86.

In order for the switch from one discrete position to the next to occur in a crisp and reliable manner, the ring 86 carrying the boss 71 possesses a certain elasticity given by a slot 88 situated level with the slider 70.

The cover 82 is conductive and possesses a conductive tab 89 which makes it possible to gather the voltage present at the level of the slider 70. In order to correctly position the cover 82 with respect to the box 80 and prevent it from turning, provision may be made for the cover 82 to comprise at least one tongue 91 which becomes housed in an indent 90 of the box 80.

What is claimed is:

1. Electrical apparatus having at least one parametrizable function, comprising at least one potentiometer having an actuation member, able to take positions, each position corresponding to a desired value of a parameter, means of analogue/digital conversion and interpretation receiving an analogue voltage delivered by the potentiometer, dependent on the position taken by the actuation member and delivering a digital signal representative of the position of the actuation member and hence of the desired value of the parameter, this digital signal serving as parametrization control signal for the apparatus, wherein the positions of the actuating member are discrete positions, the actuation member cooperating with notched indexation means, these notched indexation means demarcating these discrete positions such that a restoring force compels the actuation member to stabilize in one of the discrete positions without resting between two discrete positions.

2. Electrical apparatus according to claim 1, wherein the means of analogue/digital conversion and interpretation comprise an analogue/digital converter which receives the analogue voltage and which delivers the digital signal representative of the position of the actuation member.

3. Electrical apparatus according to claim 1, wherein the means of analogue/digital conversion and interpretation comprise an analogue/digital converter which receives the analogue voltage and which delivers an intermediate digital signal to a decoding device, the decoding device delivering the digital signal representative of the position of the actuation member.

4. Electrical apparatus according to claim 3, wherein the converter provides a digital signal coded on p+m bits, and in that the decoding device provides a signal coded on p bits from the signal coded on p+m bits.

5. Electrical apparatus according to claim 3, comprising a processing device utilizing the digital signal representative of the position of the actuation member so as to have the apparatus execute a function with a selected parameter, characterized in that the analogue/digital converter is integrated into the processing device.

6. Electrical apparatus according to claim 5, wherein the decoding device is integrated into the processing device.

7. Electrical apparatus according to claim 1, comprising several potentiometers, wherein a multiplexer is inserted between the potentiometers and the means of analogue/digital conversion and interpretation.

8. Electrical apparatus according to claim 1, wherein the indexation means comprise a first indexation means integral with the actuation member and a second indexation means carried by a shroud of the apparatus.

9. Electrical apparatus according to claim 8, wherein the first indexation means and/or the second indexation means are elastic.

10. Electrical apparatus according to claim 8, wherein the one of the indexation means comprises at least one lug and the other several notches, the lug becoming housed in one of the notches.

11. Electrical apparatus according to claim 8, wherein the indexation means comprises several lugs and the other at least one notch, the notch becoming applied to one of the lugs.

12. Electrical apparatus according to claim 8, wherein the actuation member passes through the shroud of the apparatus via an opening and comprises elastic means of snap-fastening into this opening, and in that the first indexation means is carried by the elastic means of snap-fastening.

13. Electrical apparatus according to claim 12, wherein the second indexation means is situated on the edge of the opening.

14. Electrical apparatus according to claim 1, wherein the indexation means form part of the potentiometer.

15. Electrical apparatus according to claim 14, wherein the indexation means are bosses which cooperate with one another.

16. Electrical apparatus according to claim 1, wherein the potentiometer comprises a resistive track which takes the form of discontinuous resistive lands separated by conductive lands.

17. Apparatus according to claim 16, wherein the discontinuous resistive lands are formed by a continuous resistive track covered locally with a conductive layer.

18. Apparatus according to claim 1, wherein the parameter is one operational mode of the apparatus from among several possible modes.

19. Apparatus according to claim 1, wherein the parameter is a range of values of another parameter, from among several possible ranges.

20. Apparatus according to claim 18, wherein it constitutes a timer having at least one potentiometer with indexation so as to define an operational mode and/or a potentiometer with indexation so as to defme a range of timing durations.